(12) United States Patent
Sakurai et al.

(10) Patent No.: US 7,480,549 B2
(45) Date of Patent: Jan. 20, 2009

(54) ELECTRICAL CONTROL UNIT FOR AN AUTOMOBILE

(75) Inventors: Kohei Sakurai, Hitachi (JP); Nobuyasu Kanekawa, Hitachi (JP); Mitsuru Watabe, Urizura-machi (JP); Shoji Sasaki, Hitachinaka (JP); Katsuya Oyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 12 days.

(21) Appl. No.: 11/752,365

(22) Filed: May 23, 2007

(65) Prior Publication Data

US 2007/0219671 A1  Sep. 20, 2007

Related U.S. Application Data

(63) Continuation of application No. 10/733,416, filed on Dec. 12, 2003, now Pat. No. 7,263,416.

(51) Int. Cl.
G05F 1/66 (2006.01)
B60L 9/00 (2006.01)

(52) U.S. Cl. .......................... 701/22; 700/297; 307/11; 307/18; 326/104

(58) Field of Classification Search .................. 701/22; 307/11, 18; 326/62, 99, 104; 323/234, 318; 700/297
See application file for complete search history.

(56) References Cited

U.S. PATENT DOCUMENTS

| | | | |
|---|---|---|---|
| 4,203,153 A | 5/1980 | Boyd | |
| 4,403,309 A | 9/1983 | Nakano | |
| 4,455,623 A | 6/1984 | Jurgen-Wesemeyer et al. | |
| 4,688,036 A | 8/1987 | Hirano et al. | |
| 5,151,907 A | 9/1992 | Robbins | |
| 5,166,887 A * | 11/1992 | Farrington et al. | .......... 700/293 |
| 5,239,520 A | 8/1993 | Arnold | |
| 5,305,459 A | 4/1994 | Rydel | |
| 5,621,250 A | 4/1997 | Kim | |
| 5,794,055 A | 8/1998 | Langer et al. | |
| 5,894,832 A | 4/1999 | Nogi et al. | |
| 5,999,876 A | 12/1999 | Irons et al. | |

(Continued)

FOREIGN PATENT DOCUMENTS

EP  0 930 200 B1  7/1999

(Continued)

OTHER PUBLICATIONS

European Search Report dated Jul. 10, 2006 (Four (4) pages).

(Continued)

*Primary Examiner*—Yonel Beaulieu
(74) *Attorney, Agent, or Firm*—Crowell & Moring LLP

(57) ABSTRACT

An electrical control unit for an automobile of which standby current is smaller. In an electrical control unit for an automobile having a microcomputer, an input circuit, a driver circuit, and a power supply circuit, which is started by a wake-up signal from the circuit other than the ignition switch even when the ignition switch of the automobile is cut off, the microcomputer is started by shifting the power supply circuit from an inert state to an active state to generate the voltage for operating the microcomputer, and the predetermined processing is executed.

7 Claims, 12 Drawing Sheets

U.S. PATENT DOCUMENTS

| | | |
|---|---|---|
| RE38,338 E | 12/2003 | Yoshida et al. |
| 7,046,981 B2 * | 5/2006 | Kouchiyama et al. .... 455/343.1 |
| 2001/0025889 A1 | 10/2001 | Salberg |

FOREIGN PATENT DOCUMENTS

| | | |
|---|---|---|
| EP | 1 155 886 A1 | 11/2001 |
| GB | 2 130 765 A | 6/1984 |
| GB | 2 305 557 A | 4/1997 |
| JP | 62-000649 | 1/1987 |
| JP | 6-146958 A | 5/1994 |
| JP | 07-193869 | 7/1995 |
| JP | 10-089207 | 4/1998 |
| JP | 11-182292 | 7/1999 |
| JP | 11-351003 | 12/1999 |
| JP | 2000-268588 | 9/2000 |
| JP | 2002-106408 | 4/2002 |
| JP | 2002-108519 | 4/2002 |
| JP | 2002-122039 | 4/2002 |
| JP | 2002-356127 | 12/2002 |

OTHER PUBLICATIONS

Infineon Technologies, "Multi-Voltage Processor Power Supply" Target Data Sheet, Edition 9.99, Version 1(Jan. 17, 2001) pp. 1-42.
Corresponding Notification of Reason for Rejection dated Jan. 18, 2007.

* cited by examiner

FIG. 11
WHEN BATTERY IS CONNECTED
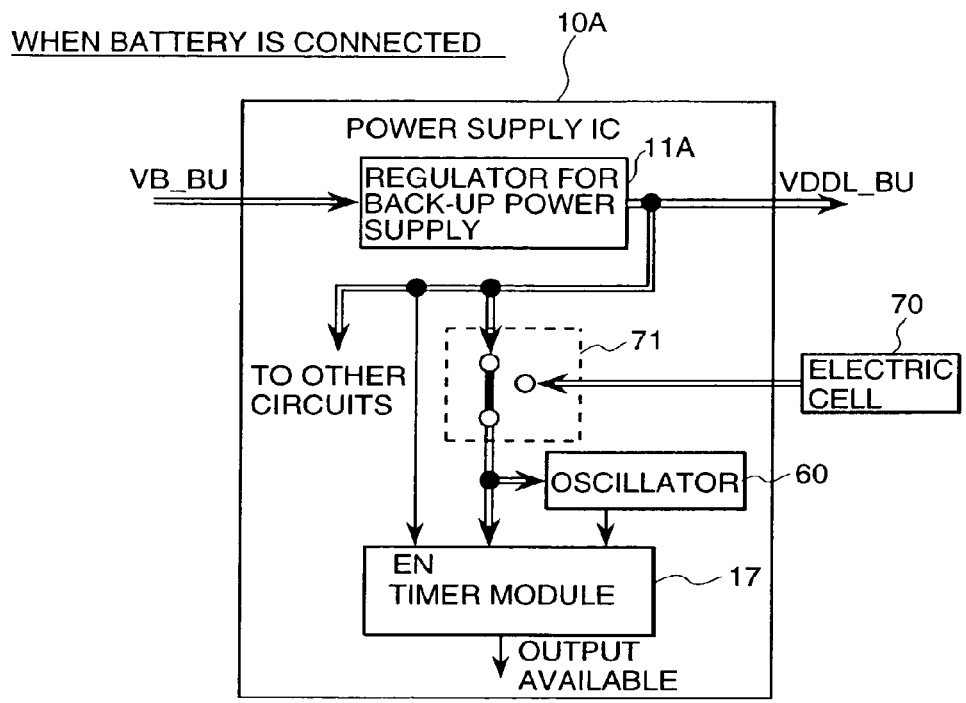
WHEN BATTERY IS NOT CONNECTED
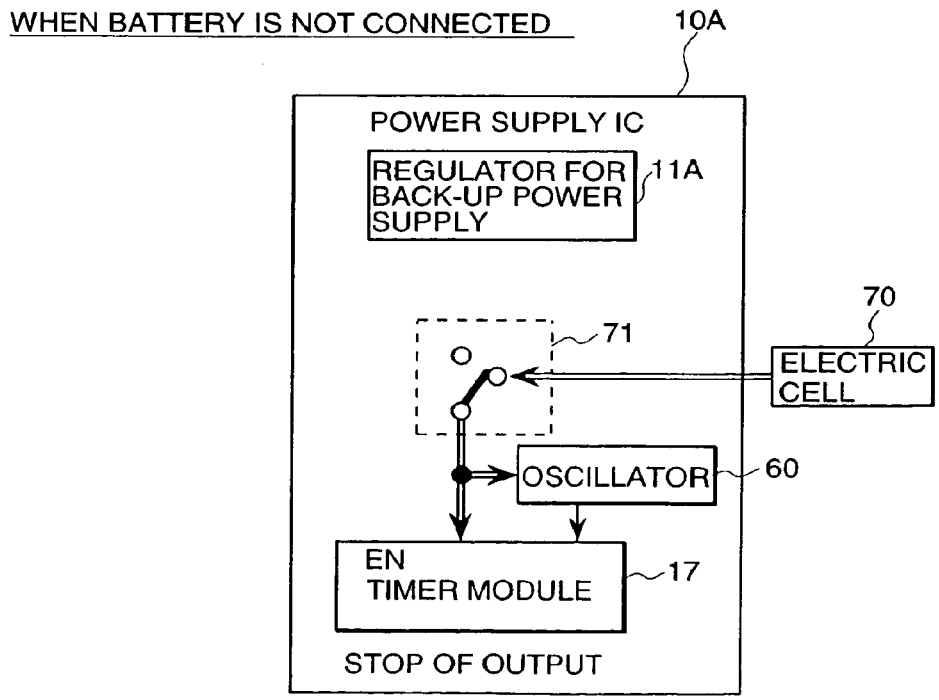

ELECTRICAL CONTROL UNIT FOR AN AUTOMOBILE

RELATED APPLICATIONS

This application is a continuation of U.S. application Ser. No. 10/733,416, filed Dec. 12, 2003, now U.S. Pat. No. 7,263,416, and claims the benefit of priority under 35 U.S.C. § 119 to JP patent application no. 2002-364544, filed Dec. 17, 2002, the disclosures of each of which are incorporated herein by reference.

BACKGROUND OF THE INVENTION

The present invention relates to an electrical control unit for an automobile. Especially, the present invention relates to an electrical control unit for an automobile started by a wake-up signal other than the ignition switch signal, even when the ignition switch is cut off.

Microcomputer is indicated when the wake-up starting circuit generates the wake-up trigger signal by inputting external switch, and this signal is input to the interrupt terminal of microcomputer and the composition that wake-up is done is disclosed in Japanese Patent Application Laid-Open No. 2002-108519.

The conventional electrical control unit needs to keep supplying the electric current from the battery when the ignition switch is cut off, because it cannot start according to a wake-up signal other than an ignition switch signal.

However, when the electric current consumption at this sleep, that is, the standby electric current is large, the amount of the electrical discharge from the battery increases when the automobile is not driven for a long term. As a result, the possibility that the engine cannot be started may occur. It is required to decrease the standby electric current of an individual electrical control unit as much as possible because various equipment such as a lot of electrical control units are installed in the present automobile.

In the conventional wake-up method in which the wake-up signal is input to an interrupt terminal of the microcomputer, it is required to keep supplying the standby electric current to a CPU core of the microcomputer at the sleep. The standby electric current of the microcomputer is small in the conventional electrical control unit of the body system in which the circuit scale of the microcomputer is comparatively small. However, the microcomputer with high performance and multi-function is installed in the electrical control unit which controls the powertrain such as an engine, etc. Therefore, the leakage current is larger because the logic scale is larger than that of the microcomputer for the body system control. As a result, there is a problem that the standby electric current of the microcomputer, and thus the standby electric current of the electrical control unit increases. Further, because it is necessary to operate the same power supply circuit as the power supply circuit which supplies the electric current to the CPU core at the normal operation in order to supply the standby electric current to the CPU core, the standby electric current will be become larger.

For instance, the special description on how to wake up the electrical control unit cannot be found in U.S. Pat. No. 5,894,832.

Further, it is required to keep supplying the electric current to the electrical control unit for which the regular wake-up is necessary, when the ignition switch is cut off. In such a case, the wake-up method by which the wake-up signal is input to the interrupt terminal of the microcomputer is undesirable as described above. Further, the consumption current of the timer module installed in the microcomputer has the tendency that increases by the influence such as the leak to the modules in the surrounding, and it relates to the increase in the standby electric current, although the method by which the wake-up signal is output by using the timer module installed in the microcomputer is thought.

SUMMARY OF THE INVENTION

The present invention is achieved in consideration of the above-mentioned problems. An object of the present invention is to provide an electrical control unit for an automobile of which the standby electric current is smaller.

To solve said problems, the present invention adopts an electrical control unit for an automobile comprised of a microcomputer, an input circuit, a driver circuit and a power supply circuit, and started by a wake-up signal other than the ignition switch signal. Concretely, said microcomputer is started by shifting said power supply circuit from an inert state to an active state to generate the voltage by which said microcomputer is operated by a wake-up signal from the circuit other than the ignition switch even when the ignition switch of said automobile is cut off, and the predetermined processing is executed by the microcomputer.

According to the above-mentioned method, it is not required to keep supplying the standby electric current to the CPU core of the microcomputer like the wake-up method in which the wake-up signal is input to the interrupt terminal of the microcomputer, since the power supply circuit (regulator) is activated by the wake-up signal by supplying only the backup power supply at the sleep. Further, the regulator which supplies the electric current to the CPU core to supply the standby electric current. Therefore, the standby electric current can be greatly decreased.

BRIEF DESCRIPTION OF DRAWINGS

FIG. 11 is a block diagram illustrating a power supply switch means installed in the power supply IC in an electrical control unit for an automobile according to a eighth embodiment.

DETAILED DESCRIPTION OF THE PREFERRED EMBODIMENTS

Figure 1:
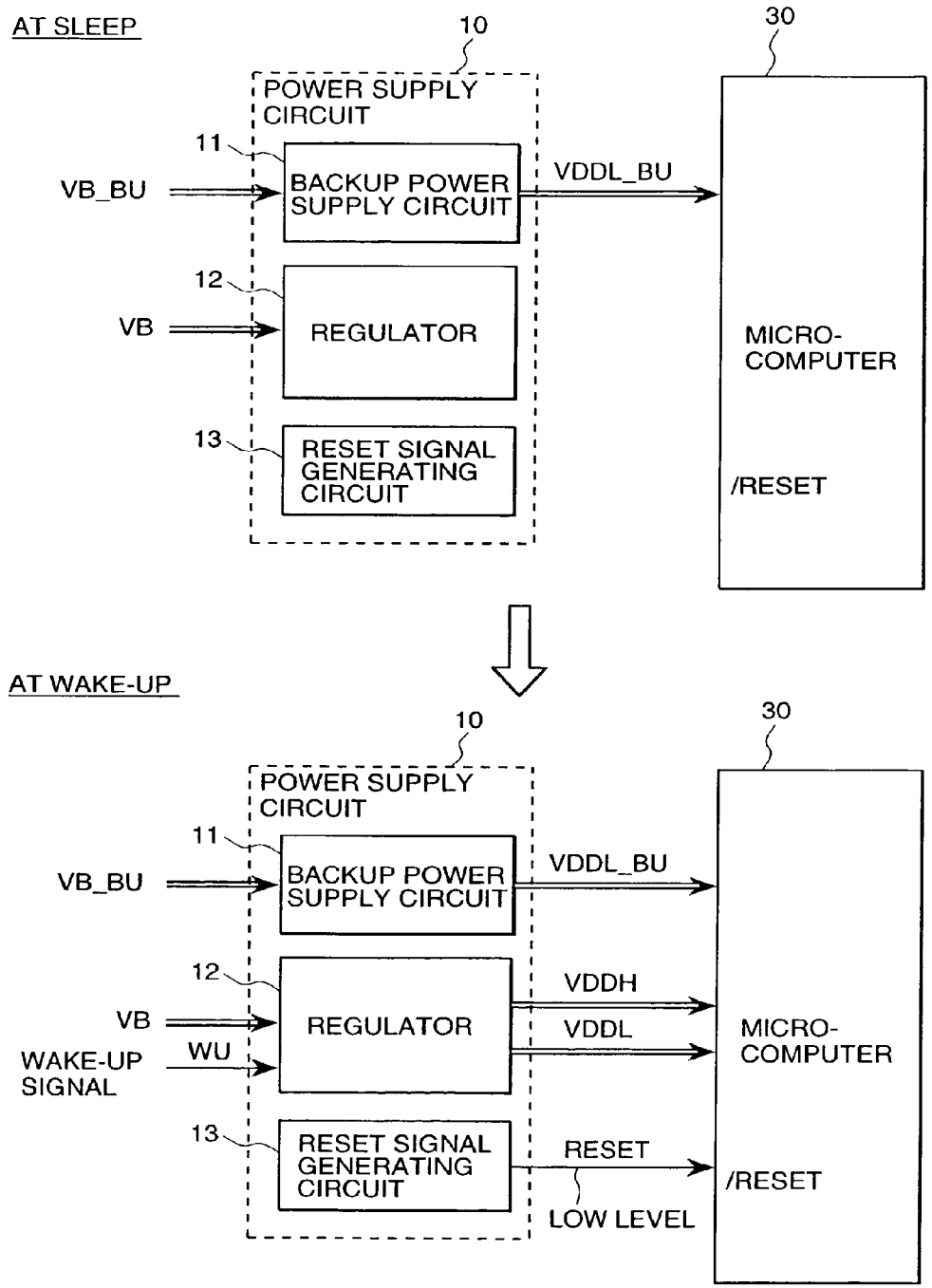
FIG. 1 is an explanatory drawing showing a wake-up method of an electrical control unit for an automobile.

The inventors studied the electrical control unit for an automobile in various ways.

There are some electrical control units for an automobile that it is necessary to execute the predetermined processing by starting it by some kind or another wake-up signal other than the ignition switch even when the ignition switch is cut off. For instance, when the ignition switch is cut off and the engine has stopped, it is required to operate the external switch circuit and the microcomputer by using the input from the external switch as for the electrical control unit which controls the equipment of the body system like the power window and the door module, etc.

In the conventional configuration, the microcomputer is waked up by providing a wake-up trigger signal from a wake-up starting circuit, and inputting this signal to the interrupt terminal of the microcomputer when the external switch signal is input. Further, in another conventional example (U.S. Pat. No. 5,894,832), the electrical control unit performs the activation processing of a cold start device (CSD) by energizing the heater of the equipment before the ignition switch is connected.

Further, it is known that in the electrical control unit in a hybrid automobile, etc. in which the drive force is generated by using the motor together with the engine, the wake-up is regularly carried out, the temperature of a battery and charging rates is monitored and these devices are controlled if necessary even when the ignition switch is cut off.

The inventors have achieved the following invention.

In an electrical control unit for an automobile comprised of a microcomputer, an input circuit, a driver circuit and a power supply circuit, and started by a wake-up signal other than the ignition switch signal, said microcomputer is started by shifting said power supply circuit from an inert state to an active state to generate the voltage by which said microcomputer is operated by a wake-up signal from the circuit other than the ignition switch even when the ignition switch of said automobile is cut off, and the predetermined processing is executed by the microcomputer.

Said wake-up signal is a signal transmitted at least from either the electrical control unit for the keyless entry, or an electrical control unit for the door lock management by which it can be perceived whether the car owner gets on or have gotten on the automobile.

The electrical control unit for an automobile starts said microcomputer by activating said power supply circuit according to this wake-up signal, and begins to turn on any one of an airflow sensor, an $O_2$ sensor, a fuel pump or various heater devices in advance of the connection of the ignition switch.

Further, another form of said wake-up signal is a signal output by the timer module which is built into the electrical control unit for the automobile or an electrical control unit other than one concerned, and composed of at least a counter, a wake-up timing setting register and a comparator, when the value of said counter reaches the value set in said wake-up timing setting register beforehand.

The electrical control unit for an automobile starts said microcomputer by activating said power supply circuit according to this wake-up signal to monitor the states of various equipment of the automobile concerned or control the equipment concerned if necessary.

Said microcomputer makes said power supply circuit inert after the execution of the processing of said ends, or after the state that the ignition switch is not connected continues during the predetermined time after the completion of the execution of said predetermined processing, and shuts down the electrical control unit for the automobile concerned again.

According to another embodiment, the electrical control unit for the automobile calculates the period elapsed after the ignition switch is cut off at the time when the ignition switch is connected by using the count value of said timer module to estimate the amount of the fuel leakage from the injector during the period concerned. Further, by using this, it corrects fuel consumption at the engine start or estimates the level of deteriorating with the passage of time of various equipment of the automobile concerned to control the automobile.

According to a further embodiment, an electrical control unit for the automobile is comprised of a microcomputer, an input circuit, a driver circuit, and a power supply circuit, and is started by a wake-up signal from the circuit other than the ignition switch even when the ignition switch of said automobile is cut off.

Further, said power supply circuit is a semiconductor IC integrated the following components, a first regulator which generates the voltage to operate said microcomputer by inputting said ignition switch signal or said wake-up signal, a second regulator which operates even when said ignition switch is cut off, an OR circuit activating said first regulator by using either the ignition switch signal or one of said plural wake-up signals, a start factor determining means to distinguish whether said first regulator is activated by which signal of the ignition switch signal and one of plural wake-up signals, a communication driver which transmits and receives the communication signal with an outside electrical control unit through a communications line, a latch circuit to latch the wake-up signals transmitted from the outside electrical control unit through said communications line, a reset circuit which generates a reset signal to said microcomputer, a watchdog timer to prevent the runaway of the active program in said microcomputer, and a serial communications module which communicates serially with said microcomputer.

The start factor distinguished by the start factor determining means of said semiconductor IC is transmitted to said microcomputer through said serial communications module.

In the electrical control unit for an automobile according to a further embodiment, said semiconductor IC includes a counter, a wake-up timing setting register, and a comparator, and a timer module which outputs the wake-up signal when the value of said counter reaches the value set in said wake-up timing setting register beforehand is integrated therewith.

Further, said microcomputer sets the value of said wake-up timing setting register of said timer module through the serial communications module of said semiconductor IC, or said timer module transmits the counter value at that time to said microcomputer.

The electrical control unit for the automobile provides inside with the power supply to operate at least said timer module for the period when the power supply is not supplied from the outside. Said semiconductor IC has the power supply switch means. Said switch means supplies a current to said timer module either from said outside power supply for the period when the power supply is supplied from the outside to said electrical control unit for the automobile, or from the power supply provided in said electrical control unit for the automobile for the period when the power supply is not supplied from the outside.

Further, in the electrical control unit for an automobile of another type, the power supply such as lithium electric cell is provided in the electrical control unit to operate said timer module at least even when the power supply is not supplied from the outside to the electrical control unit for an automobile. Further, there is a power supply switch means to supply the electric current to the timer module. It supplies the current from the power supply provided in the electrical control unit for an automobile, when the power supply is not supplied from the outside, and only from the external power supply when the power supply is supplied from the outside. The electrical control unit for an automobile has the feature that this power supply switch means is integrated into the semiconductor IC having the timer module inside.

Hereinafter, an embodiment of the electrical control unit for an automobile will be explained with reference to the drawings.

FIG. 1 is an explanatory drawing concerning a wake-up method of the electrical control unit for an automobile, and shows only a microcomputer and a power supply circuit necessary for explaining the wake-up method.

Power supply circuit 10 is composed of backup power supply circuit 11, regulator 12, and reset signal generating circuit 13. This power supply circuit 10 generates a voltage for operating microcomputer 30 from the voltages VB, VB_BU of the battery. Backup power supply circuit 11 is a constant voltage source which composed of a regulator, or a resistor and a Zener diode, and which supplies the electric power to an electronic circuit such as a RAM built in microcomputer 30 necessary always to supply the electric power regardless of the on/off of the ignition switch by regulating VB_BU connected to the battery. Regulator 12 regulates VB, and supplies the electric power to the entire electrical parts installed in the electrical control unit such as a microcomputer.

The wake-up method is explained by using FIG. 1. Only backup power supply circuit 11 works, and supplies VDDL_BU to microcomputer 30 at the switching-off of the ignition, that is, at the sleep. Microcomputer 30 is in an operation mode in which only the data of the built-in RAM is maintained. At this time, VB is supplied to the input terminal though regulator 12 is not operated. By activating regulator 12 according to wake-up signal WU at the wake-up time, the supply of the power source VDDH for the I/O circuit in the peripheral module and the power supply VDDL for the CPU core to microcomputer 30 is started. After these voltages are generated, reset signal generating circuit 13 makes the reset signal low for the predetermined period, and makes microcomputer 30 power-on reset. Microcomputer 30 shifts to the normal operation mode by the power-on reset, and the electrical control unit starts.

Thus, the standby electric current need not keep being supplied to the CPU core of the microcomputer at the sleep like the conventional wake-up method to input the wake-up signal to the interrupt terminal of the microcomputer, because the wake-up method by power-on reset supplies only the backup power supply at the sleep, and activates regulator 12 for the first time by the wake-up signal. In addition, it is not necessary to operate regulator 12 which supplies the electric current to the CPU core in order to supply the standby electric current. As a result, the standby electric current can be greatly decreased.

Figure 2:
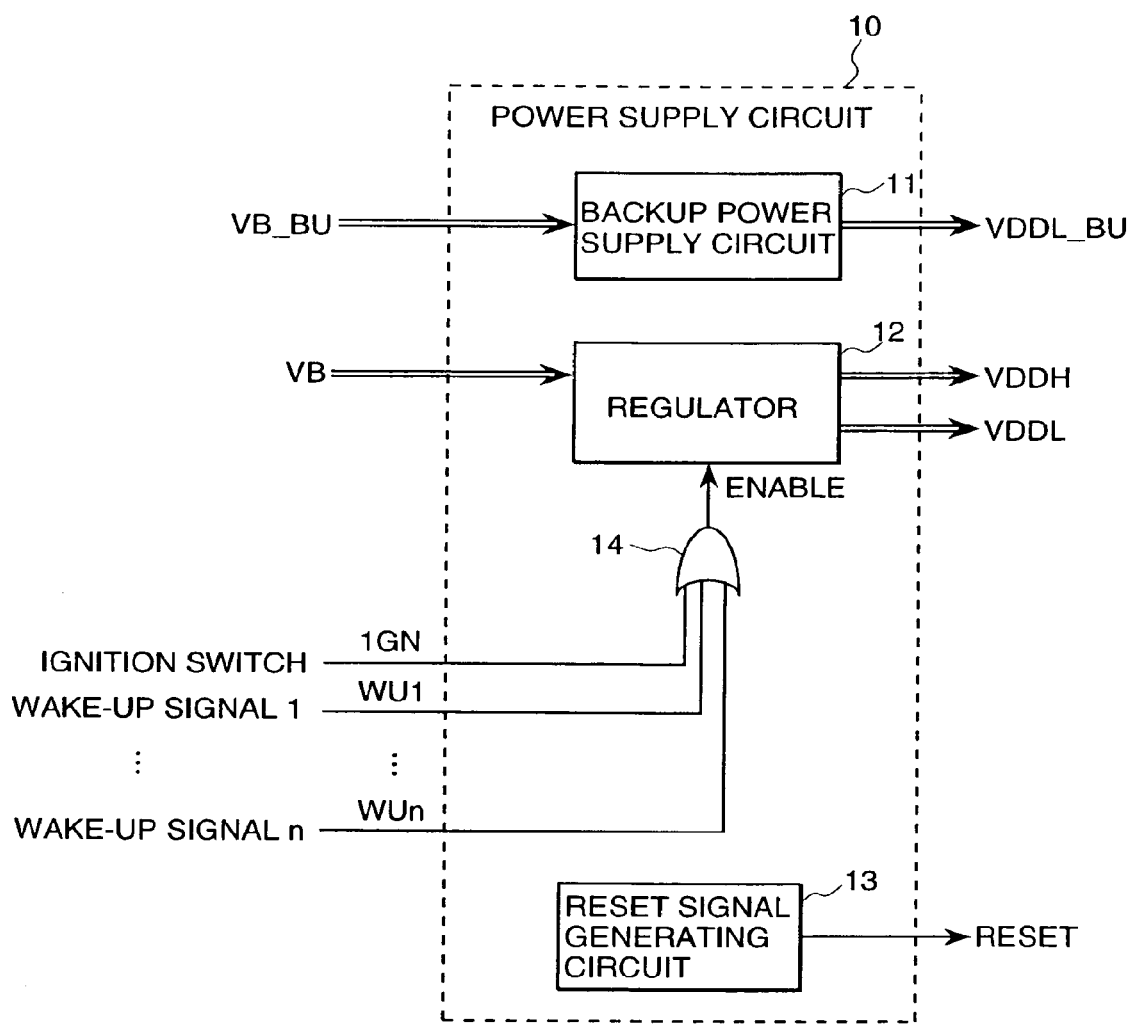
FIG. 2 is a block diagram of a power supply circuit of the electrical control unit for an automobile according to a first embodiment.

FIG. 2 shows a first embodiment of the electrical control unit for an automobile, which is started by two or more wake-up signals including a signal from the ignition switch. An Enable terminal which activates or inactivates regulator 12 from the outside is provided in regulator 12 of power supply circuit 10. For instance, when this Enable terminal is at a High level, regulator 12 supplies the electric current to the microcomputer, and it stops the operation so that the output voltage may become 0V when at a Low level. In addition, ignition switch signal IGN and wake-up signals WU1 to WU are input to OR circuit 14, and the output of OR circuit 14 is input to said Enable terminal.

Thus, when either one of two or more wake-up signals becomes High level, the output of the OR circuit changes from a Low level into a High level, and regulator 12 can be started.

Figure 3:
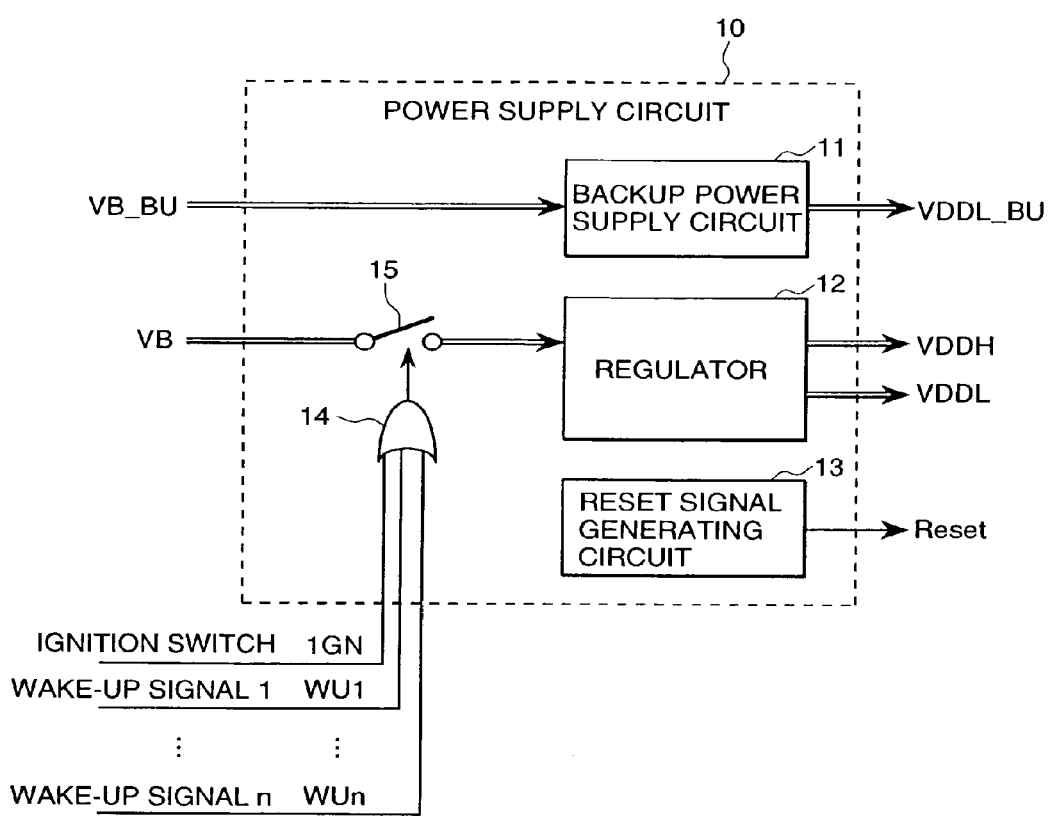
FIG. 3 is a block diagram of a power supply circuit of the electrical control unit for an automobile according to a second embodiment.

FIG. 3 shows a second embodiment. Although this embodiment relates to the electrical control unit for an automobile started by two or more wake-up signals including the ignition switch signal like the first embodiment, Switch 15 is installed on the VB line in front of the input terminal of regulator 12 as a part of power supply circuit 10. Concretely, a MOS transistor etc. can be used as the switch. Ignition switch signal IGN and wake-up signals WU1 to WU are input to OR circuit 14 like the first embodiment.

If the switch 15 is composed so that it may turn on for instance when the output of this OR circuit 14 is only at a High level, switch 15 is turned on and voltage VB is input to regulator 12 when either one of two or more wake-up signals becomes High level. As a result, power supplies VDDH and VDDL can be supplied to the microcomputer. It is possible to control whether to supply the power supply to the microcomputer by turning on/off switch 15 according to this embodiment, even if the function for activating or inactivating regulator 12 from the outside is not provided in the regulator.

Figure 4:
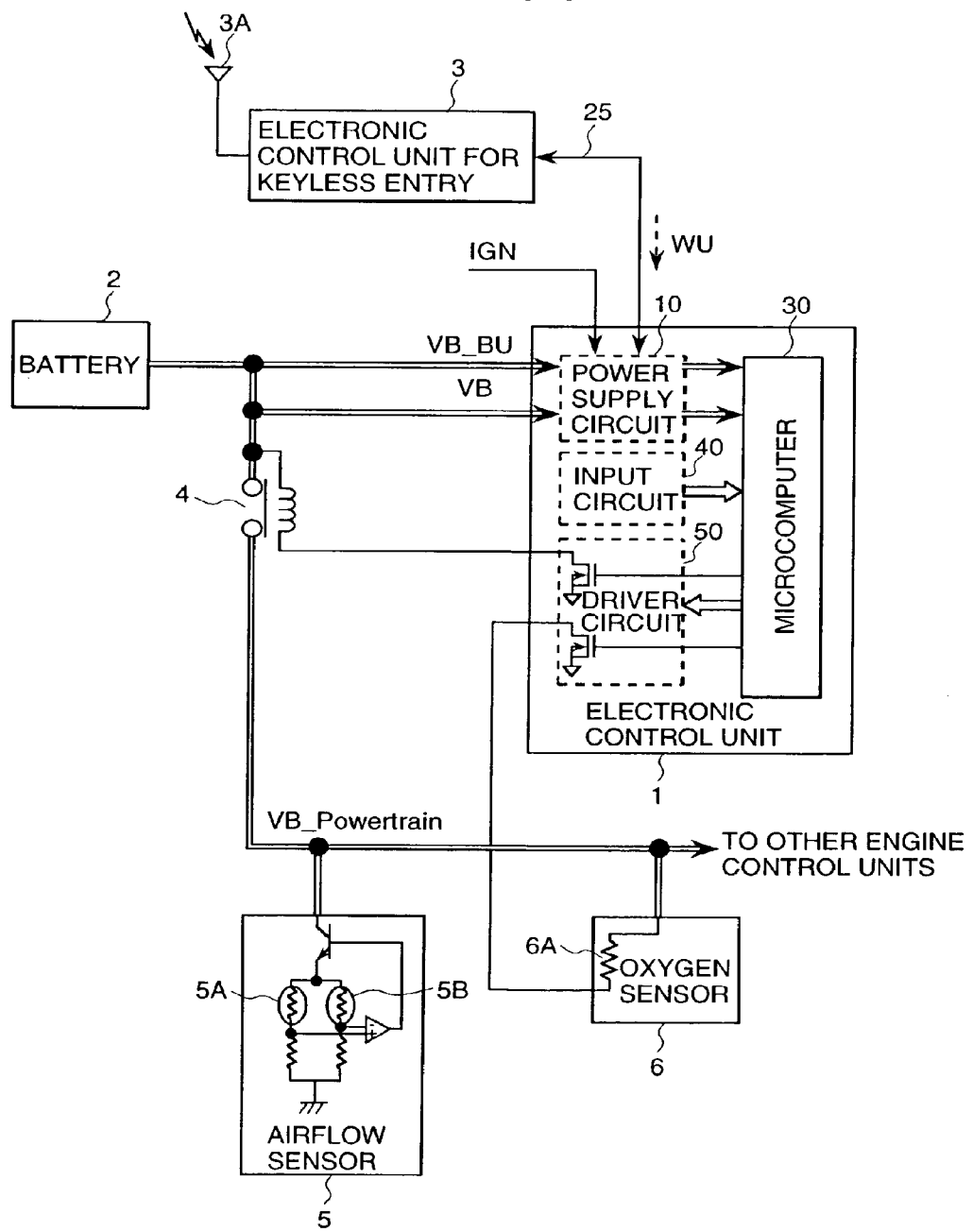
FIG. 4 is an electrical control unit for an automobile according to a third embodiment in which a sensor is controlled by using the wake-up method.

FIG. 4 shows an electrical control unit for an automobile according to a third embodiment to which the wake-up method is applied.

Electrical control unit 1 is composed of power supply circuit 10 having the composition of the first or second embodiment, microcomputer 30, input circuit 40 which preprocesses the input signal from the sensor and the switch, and driver circuit 50 which drives the actuator.

Referring to FIG. 4, details of this embodiment in which the sensor for the engine control is activated between the release of the door lock by a driver and the turn-on of the ignition switch will be explained. When the driver gets on the automobile, the door lock release signal is transmitted to the automobile by pushing the button of the ignition key. When this signal is supplied by an electric wave, the signal is sent to electrical control unit 3 for keyless entry through antenna 3A of FIG. 4. Electrical control unit 3 for keyless entry releases the door lock, and transmits wake-up signal WU to electrical control unit 1 through serial communications line 25 such as a CAN. At this point, ignition switch IGN is still at the off-state. The power supply is started with wake-up signal WU, and supplied to microcomputer 30. Microcomputer 30 begins the normal operation through power-on reset. Microcomputer 30 turns on powertrain relay 4 by turning on the MOS transistor of driver circuit 50 after executing the initialization processing, and supplies battery voltage VB_Powertrain to sensors, various engine control equipment and others. As a result, the electric current flows to heat resistor 5A for airflow measurement and themosensitivity resistor 5B for the temperature detection of airflow sensor 5, and the airflow measurement with airflow sensor 5 becomes possible. Further, microcomputer 30 supplies the electric current to heat resistor 6A of O₂ sensor 6 by turning on another MOS transistor of driver circuit 50, and heats and activates the O₂ sensor.

It will be thought that these sensors have been activated enough by the time the driver turns on the ignition switch and the engine is started, because time from the reception of the door lock release signal by electrical control unit 3 for keyless entry to the activation of airflow sensor 5 and O₂ sensor 6 is about several seconds. Therefore, the amount of harmful exhaust gas at the engine starting can be reduced.

Although it is difficult to put the method of decreasing the harmful exhaust gas at the engine starting by activating the sensors, etc. before the ignition switch is turned on into practical use in case of an electrical control unit with a large standby electric current by the conventional wake-up method, it becomes possible for the first time by using electrical control unit 1 of which the standby electric current is very small like this embodiment. In addition, because the electric current can be supplied into the load before the ignition switching-on, the turn-on time of the MOS transistor which supplies the electric current to the heat resistor 6A of O₂ sensor 6 can be increased. Therefore, a secondary effect which is that the peak current can be suppressed and the size of the transistor can be miniaturized is obtained.

Although the airflow sensor and the O₂ sensor is activated before the ignition switching-on in this embodiment, it is also possible to supply the electric current to the equipment such as a fuel pump, the heater of a cold start device (CSD), and activate them as well as the sensors. Further, although electrical control unit 3 for keyless entry transmits the wake-up signal WU to electrical control unit 1 through serial communications line 25 such as the CAN in this embodiment, it is possible to transmit the wake-up signal directly with a special signal conductor without the serial communications line. In addition, it is possible to install powertrain relay 4 on the upstream side of the VB line so that the battery voltage may not supplied from the VB line at the ignition switching-off, although there are two input terminals for the battery voltage of electrical control unit 1 and each is always connected to battery 2 regardless of the on/off of the ignition switch in this embodiment. In this case, it is necessary to supply the battery voltage to the input terminal of regulator 12 of power supply circuit 10 by separating VB_BU at the inside of the electrical control unit 1.

Figure 5:
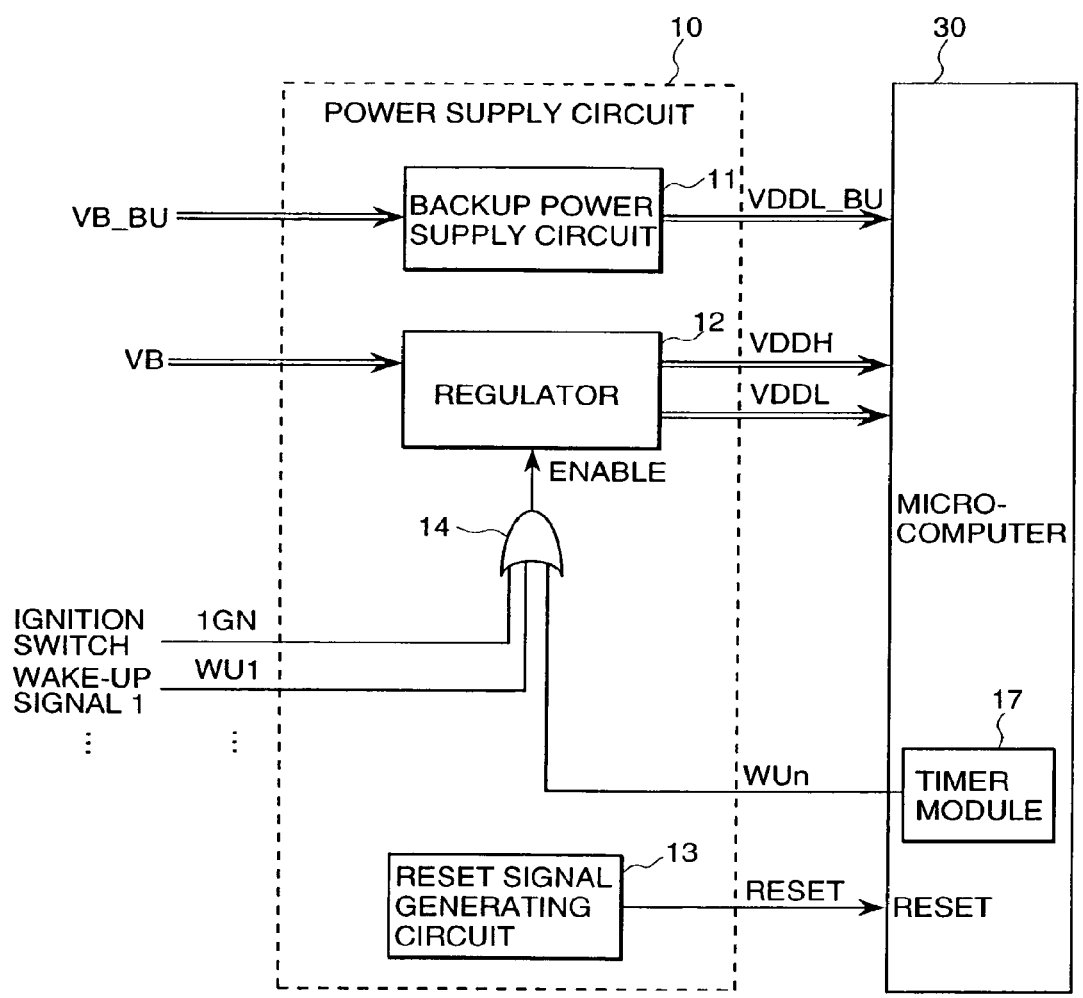
FIG. 5 is a block diagram of a power supply circuit and a microcomputer of the electrical control unit for an automobile according to a fourth embodiment.

The electrical control unit for the automobile according to a fourth embodiment is shown in FIG. 5.

This embodiment has the feature that at least one of wake-up signals is transmitted from the timer module. In this embodiment, wake-up signal WUn is output by using timer module 17 built in microcomputer 30. Therefore, it is necessary to supply the power supply to timer module 17 even at the ignition switching-off to keep operating. The method of controlling regulator 12 according to inputting two or more wake-up signals which contain the wake-up signal of the timer module from 17 to OR circuit 14 of power supply circuit 10 is as described in the first embodiment.

Figure 6:
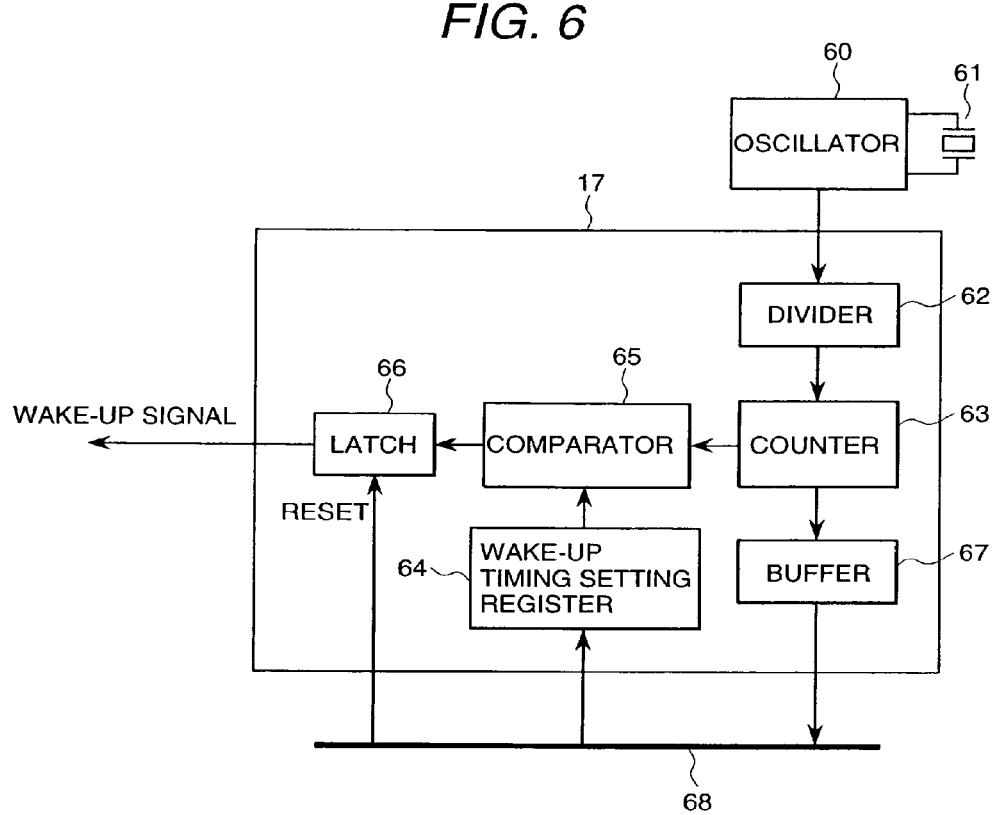
FIG. 6 is a block diagram of a timer module circuit.

The configuration of timer module 17 will be explained by using FIG. 6. Timer module 17 is composed of divider 62, counter 63, wake-up timing setting register 64, comparator 65, latch 66, and buffer 67. The clock pulse generated by quartz vibrator 61 and divider 62 is divided into clock pulses with the suitable frequency. This clock pulse divided is counted by counter 63 as a time base. Comparator 65 compares the counter values of counter 63 with the value set in wake-up timing setting register 64. The output is changed from a Low to a High or from a High to a Low when these values are matched. Latch 66 latches this change and outputs the wake-up signal. This latch output is reset when a reset signal from bus 68 is input to latch 66. The predetermined value can be written in wake-up timing setting register 64 from bus 68. Further, the value of counter 63 can be output to bus 68 through buffer 67.

Figure 7:
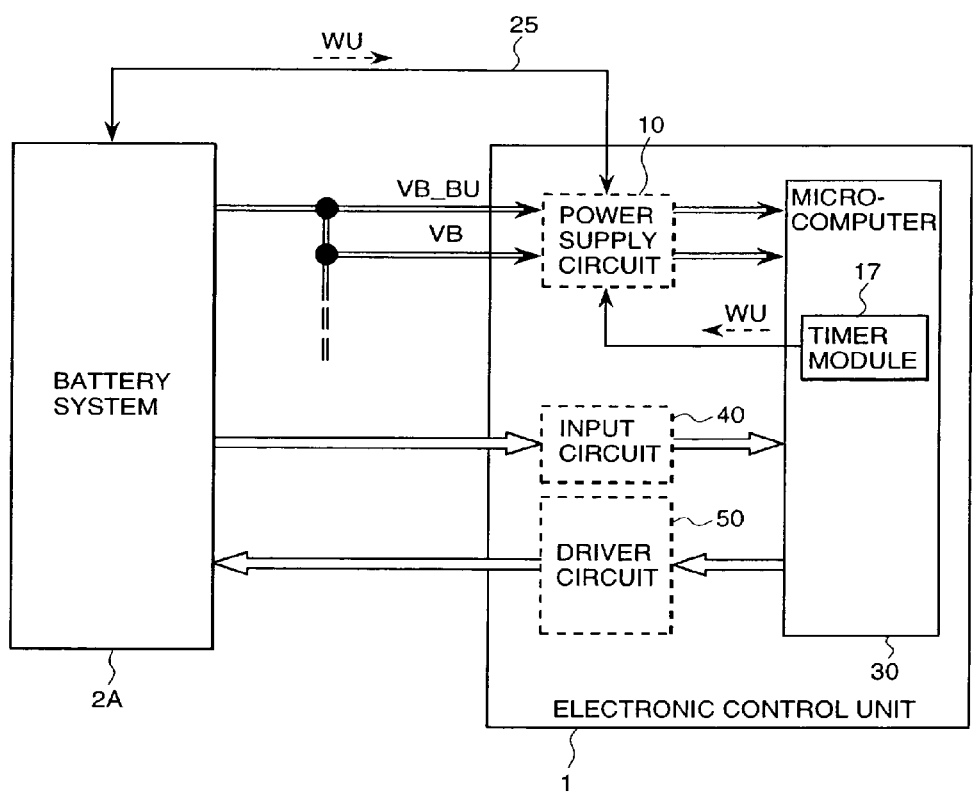
FIG. 7 is an electrical control unit for an automobile according to a fifth embodiment in which the battery system is controlled by using the wake-up method.

The electrical control unit for an automobile according to a fifth embodiment is shown in FIG. 7. The way according to the fourth embodiment is applied to the electrical control unit according to this embodiment. That is, power supply circuit 10 can be started according to wake-up signal WU from the timer module 17 built in microcomputer 30.

Details of this embodiment will be explained by using FIG. 7. When the period set beforehand elapses before electrical control unit 1 changes in the last sleep state, timer module 17 outputs wake-up signal WU to the power supply circuit. As a result, the power supply is supplied to microcomputer 30, and microcomputer 30 begins the normal operation through the power-on reset. Microcomputer 30 judges the state of the battery from information such as the temperature of the battery and the charging rate, etc., sensed by the battery system 2A after the initialization processing is executed, and transmits a control signal, for example, to cool the battery to the battery system 2A if necessary. Because timer module 17 gives the wake-up signal every certain period, the state of the battery can be monitored periodically even when the ignition switch is turned off, and the battery can be kept in the best state.

In this embodiment, it is possible to wake up electrical control unit 1 periodically even if the timer module is not mounted on electrical control unit 1, but on the battery system 2A side, because the wake-up signal is received periodically from battery system 2A through serial communications line 25 such as a CAN, and power supply circuit 10 is started. In any case, a periodic battery control at the ignition switching-off can be done in a hybrid automobile etc. with the standby electric current of the electrical control unit kept small according to this embodiment.

Further, various controls become possible in this embodiment because a CPU of microcomputer 30 reads the counter value of timer module 17, and measures time. For instance, the time after the ignition switch is turned off last time is calculated at the ignition switching-on. The gross weight of the fuel leaked from the injector is estimated in this time. An unburnt element in the exhaust gas at the engine starting can be decreased by correcting fuel injection amount at the engine starting by using this estimate. Further, if timer module 17 is always operated, it is possible to know the elapsed time after the automobile begins running. Therefore, the amount of harmful exhaust gas of the automobile can be suppressed to the level equivalent to the amount immediately after beginning of running for years by estimating the deteriorating with the passage of time degree of various equipment based on the elapsed time and tuning online control parameters.

Figure 8:
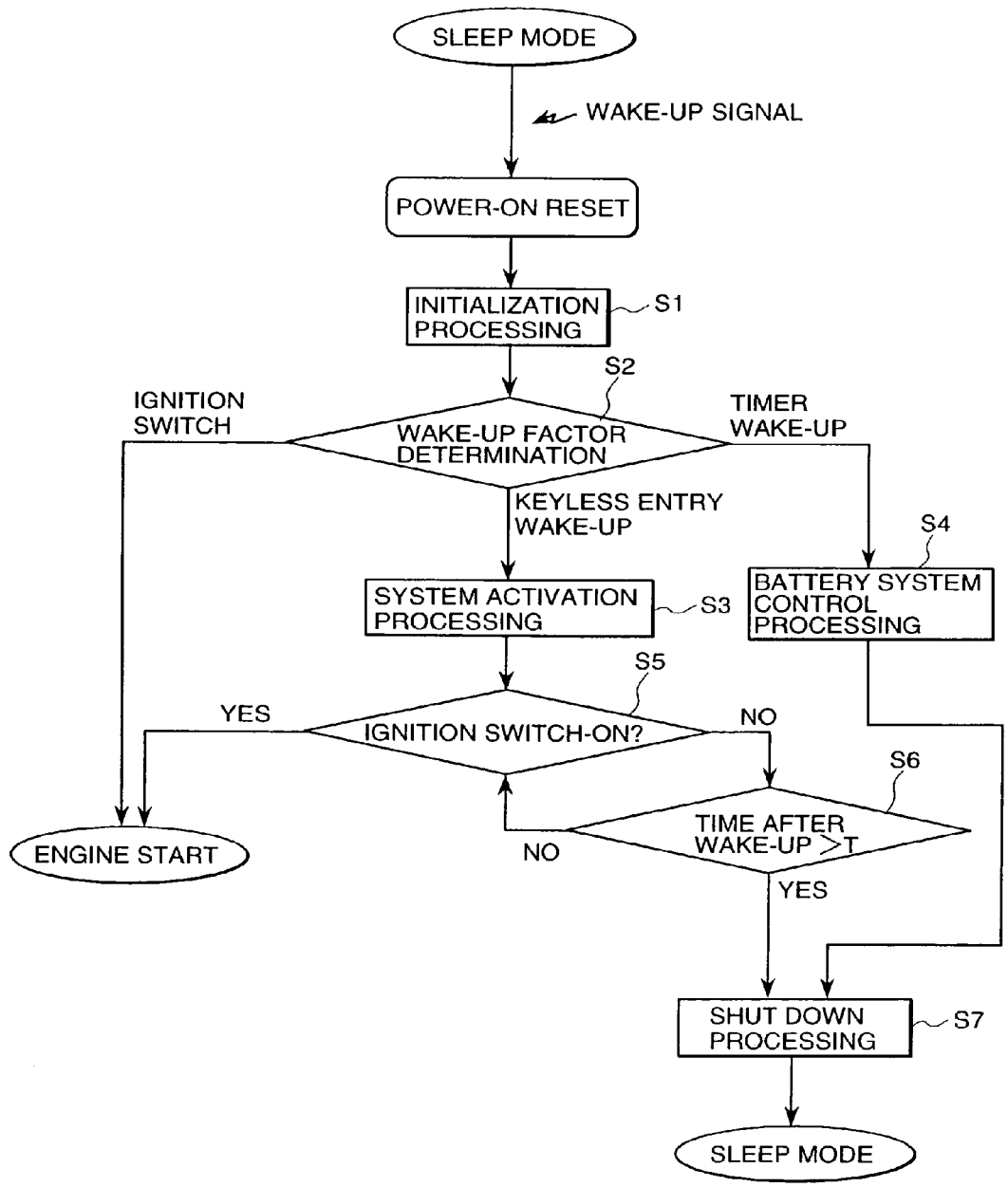
FIG. 8 is a control flow chart of the wake-up in an electrical control unit for an automobile according to the third embodiment and the fifth embodiment.

The control-flow at wake-up in the electrical control units for an automobile according to the third and the fifth embodiments is shown in FIG. 8. The microcomputer is started by power-on reset when the wake-up signal is input. As a result, the electrical control unit for an automobile wakes up from sleep mode.

First of all, initialization is executed in step S1, then the wake-up factor is judged in step S2. The engine is started when judged that wake-up was done by the ignition switching-on. The processing advances to step S3 when judged that the wake-up was done according to the wake-up signal from the electrical control unit for keyless entry. The system activation processing which energizes to the sensor, the fuel pump, and the cold start device, etc. is executed as described in the third embodiment. Next, it is confirmed whether the ignition switch turned on in step S5. If it has been turned on, the engine is started, otherwise, the processing advances to step S6. It is judged whether long time has passed since preset time T after the wake-up is done. The processing returns to step S5 again when the elapsed time is less than time T. The processing advances to step S7 when the time more than time T passes, the shutdown processing to stop the operation of the power supply circuit is executed, and the processing shifts to the sleep mode again. The processing advances to step S4 when judged that the wake-up was done according to the wake-up signal from the timer module in step S2, and the control processing of the battery system is executed as described in the fifth embodiment. The shutdown processing in step S7 is executed after this processing ends, and the processing shifts to the sleep mode again. Thus, the electrical control unit is prevented from keeping starting by executing the shutdown processing after the execution of after the state that the ignition switch does not turn on after the execution of the system activation processing ends continues during the predetermined time of period or after the battery system control processing ends, and shifting to the sleep mode again. As a result, the amount of the electrical discharge of the battery at the ignition switching-off can be decreased.

Figure 9:
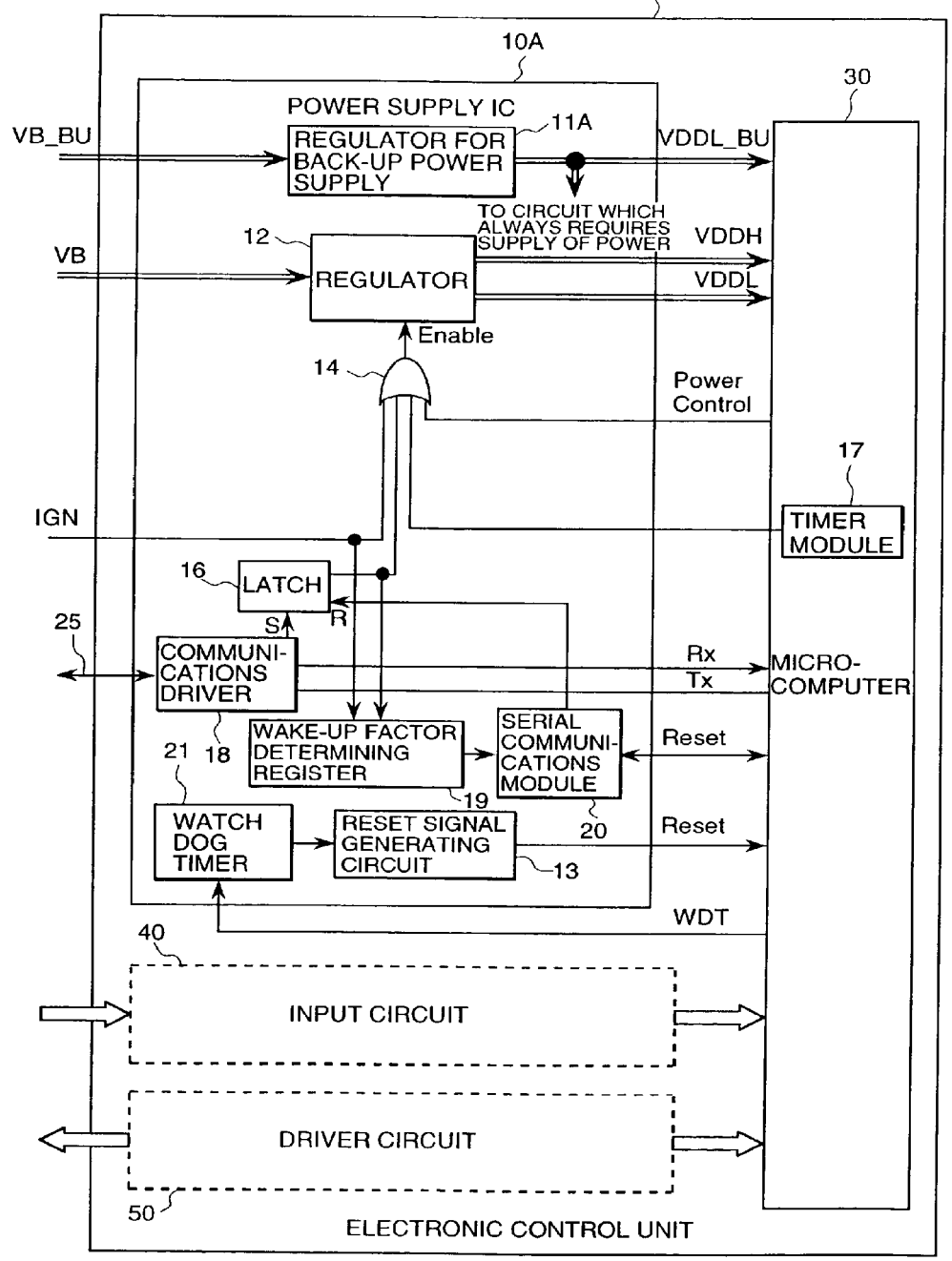
FIG. 9 is a block diagram of an electrical control unit for an automobile according to a sixth embodiment, which includes the detailed circuit block diagram of the power supply IC.

The electrical control unit for an automobile according to a sixth embodiment is shown in FIG. 9. The electrical control unit of this embodiment has the feature that a function necessary to execute the predetermined processing by starting according to a wake-up signal other than the ignition switch even when the ignition switch is cut off is made as a single-chip of a power supply IC. Power supply IC 10A in this embodiment is composed of the following components. Regulator 12 which generates voltage to operate microcomputer 30 by inputting an ignition switch signal or a wake-up signal, regulator 11A for a backup power supply which supplies the power supply to the circuit such as microcomputer 30 and power supply IC 10A in which power supply is always necessary at sleep, OR circuit 14 to activate regulator 12 according to either one of the ignition switch signal or a plurality of wake-up signals, Wake-up factor determining register 19 which distinguishes whether regulator 12 is activated by either one of the ignition switch or two or more wake-up signals, communication driver 18 which transmits and receives a communications signal to and from outside electrical control unit by serial communications line 25 such as a CAN, circuit 16 which latches the wake-up signal transmitted from an outside electrical control unit through serial communications line 25 such as a CAN, reset signal generating circuit 13 which generates the reset signal to microcomputer 30, watchdog timer 21 to prevent the runaway of active program running in microcomputer 30, and serial communications module 20 which communicates in serial with microcomputer 30.

The operation of power supply IC 10A and microcomputer 30 composed like this will be explained in detail. The power supply from the regulator 11A for backup power supply is supplied to communication driver 18, latch 16, wake-up factor determining register 19, OR circuit 14, and timer module 17 built in microcomputer 30 at the sleep in this embodiment.

The outputs of ignition switch IGN and latch 16, the output from the timer module 17 built in microcomputer 30, and the power control signal from a general-purpose port are input to OR circuit 14, and the output of OR circuit 14 is input to the Enable terminal of regulator 12. If either one of the signals input to above-mentioned OR circuit 14 is at a High state, regulator 12 supplies voltages VDDH and VDDL to microcomputer 30. Microcomputer 30 makes the power control signal high by the initialization processing after the start. As a result, two of input signals to OR circuit 14 becomes high, and the reliability of the operation of regulator 12 can be improved.

Because the wake-up signal transmitted from an outside electrical control unit through serial communications line 25 such as a CAN is a pulse signal of which pulse width is about 100 μs, regulator 12 cannot be started by this pulse width. Therefore, latch 16 which memorizes the level change in Rx signal from communication driver 18 is needed. Rx signal from communication driver 18 is input to set terminal (S) of latch 16. The output of latch 16 and the ignition switch signal IGN is input not only to OR circuit 14, but also wake-up factor determining register 19. The content of wake-up factor determining register 19 is transmitted to microcomputer 30 via serial communications module 20 according to the demand of microcomputer 30 after the wake-up. As a result, microcomputer 30 can judge the wake-up factor which corresponds to step S2 of FIG. 8. Although the SPI (Serial Peripheral Interface) protocol is used as the communication between microcomputer 30 and power supply IC 10A in this embodiment, it is possible to use another serial communications method.

Reset signal generating circuit 13 outputs the power-on reset signal to microcomputer 30 when regulator 12 starts. Further, it outputs the reset signal to microcomputer 30 also when the program being executed in microcomputer 30 runs away, the WDT signal which clears watchdog timer 21 is not supplied from microcomputer 30, and thus the timer of watchdog timer 21 overflows.

The processing at the turn-off of the ignition switch explained in the third or the fifth embodiment is carried out after the ignition switch is turned off by the end of the operation of the automobile, and microcomputer 30 carries out the shutdown processing which corresponds to step S7 of FIG. 8. Microcomputer 30 transmits the command by which latch 16 is reset to power supply IC 10A by the SPI communication. The reset signal is sent to reset terminal (R) of the latch by serial communications module 20, and the output of the latch is shifted to a Low state. Microcomputer 30 voluntarily makes the power control signal low, stops the operation of regulator 12 after the whole shutdown processing including the data backup to the RAM ends. As a result, the electrical control unit shuts down.

In this embodiment, it is also possible to transmit the WDT signal which clears watchdog timer 21 and the power control signal to power supply IC 10A by the SPI communication to decrease the number of use ports of microcomputer 30.

Because the function to control the power supply of the electrical control unit is integrated into one IC according to this embodiment, it becomes possible to decrease the number of parts of the electrical control unit and improve the reliability. Especially, as described so far, it is actually important to have built OR circuit 14 and wake-up factor determining register 19 into power supply IC so that the microcomputer can be started by any one of two or more wake-up signals. The determination of the wake-up factor may be achieved by inputting each wake-up signal directly to a general-purpose port of the microcomputer, and observing the state of those ports by the software after the microcomputer starts. However, the number of use ports of the microcomputer increases according to this method. Further, it is necessary to provide a tri-state buffer etc. between the output source of the wake-up signal and the microcomputer so that the electric current should not flow from the output source of the wake-up signal into the microcomputer because the power supply is not supplied to a general-purpose port of microcomputer at the time of the wake-up signal input. There is the disadvantage comparing with the method according to this embodiment in which the power supply IC transmits the wake-up factor to the microcomputer according to the demand from the microcomputer by way of the SPI communication after the microcomputer starts.

Figure 10:
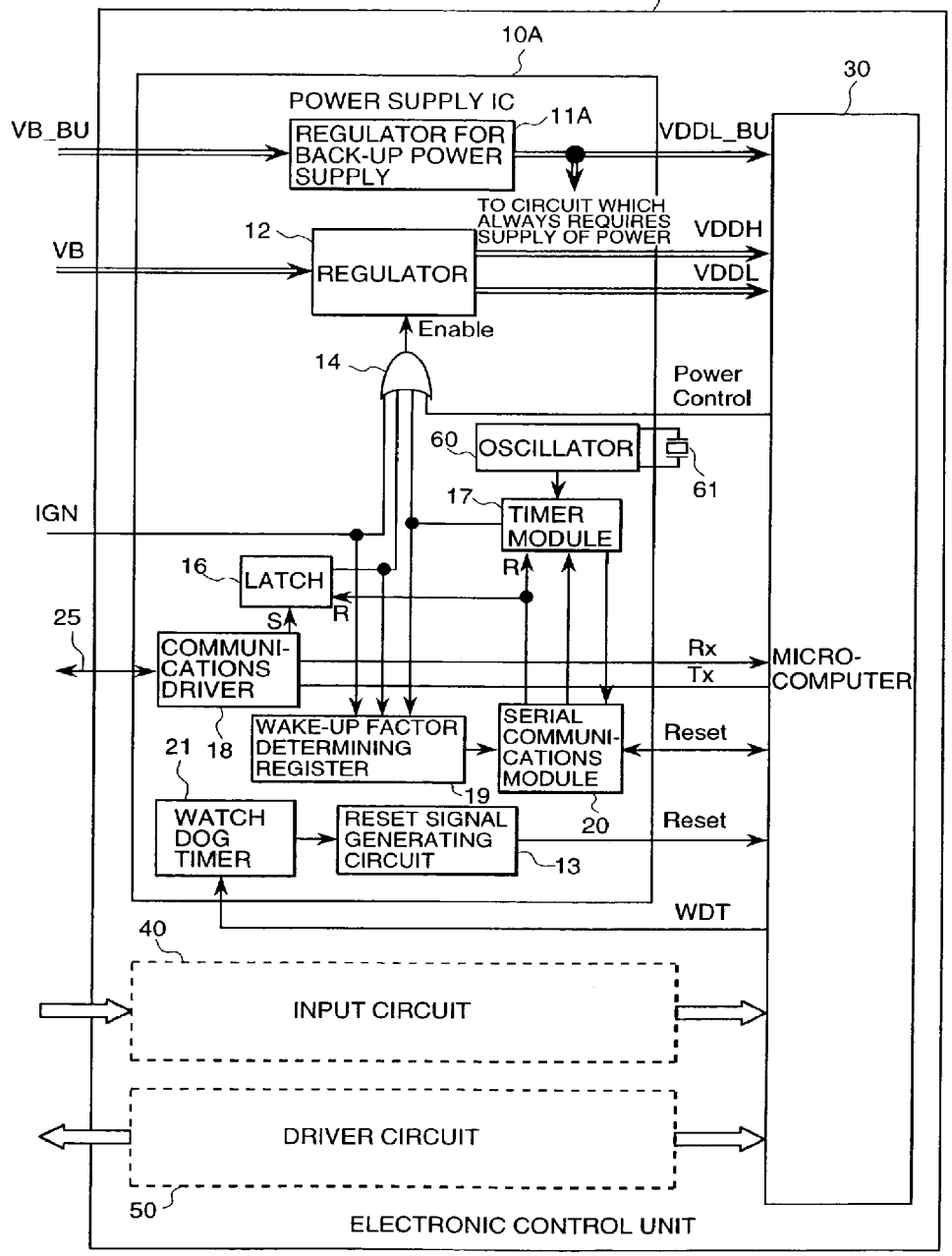
FIG. 10 is a block diagram of an electrical control unit for an automobile according to a seventh embodiment, which includes the detailed circuit block diagram of the power supply IC.

The electrical control unit for an automobile according to a seventh embodiment is shown in FIG. 10. According to this embodiment, a timer module is also integrated in the power supply IC according to the sixth embodiment. In consideration of the difference between the sixth embodiment and this embodiment, the power supply IC will be explained.

The clock pulse generated from quartz vibrator 61 and oscillator 60 is input to timer module 17 built in the power supply IC of this embodiment. The composition of timer module 17 is as shown in FIG. 6. Because the counter value of timer module 17 is transmitted to microcomputer 30 by the SPI communication, microcomputer 30 can control as mentioned above by using this value. Further, when the shutdown processing is performed, microcomputer 30 can write the value corresponding to time when the wake-up is done next to wake-up timing setting register 64, and can reset latch 66 which outputs the wake-up signal for timer module 17 via the SPI communication.

The current consumption of the timer module has the tendency which increases by the influence such as the leakage on the surrounding module. However, because the timer module is built into the power supply IC of which the scale of logic is far small compared with the microcomputer, the current consumption can be greatly decreased compared with the case where this is built into the microcomputer. This is effective to decrease further the standby electric current in the electrical control unit at the sleep. According to this embodiment, it becomes possible to control the battery etc. by waking up periodically as explained in the fifth embodiment even when the microcomputer without the built-in timer module is used.

The electrical control unit for an automobile according to an eighth embodiment is shown in FIG. 11. The electrical control unit for an automobile of this embodiment has the feature in having provided with the power supply such as BR system lithium electric cell in the device.

When the battery voltage is not supplied from the outside to this electrical control unit, electric cell 70 can supply the power supply to timer module 17 of power supply IC 10A in this embodiment. Further, power supply switch means 71 is installed in power supply IC 10A, and electric cell 70 is composed so as not to supply the power supply when the battery is connected as shown in FIG. 11. When the battery is connected, the power supply of timer module 17 and oscillator 60 is connected to VDDL_BU generated by the regulator 11A for backup power supply through power supply switch means 71. The output of latch 66 and buffer 67 of timer module 17 (Referring to FIG. 6) becomes possible by inputting VDDL_BU to EN terminal of timer module 17. When the power supply is not supplied from the outside, for example, by exchanging the battery, the power supply of timer module 17 and oscillator 60 is connected to electric cell 70. The input voltage of EN terminal of timer module 17 becomes 0 V, and the output of latch 66 and buffer 67 enters the state of the high impedance.

Figure 12:
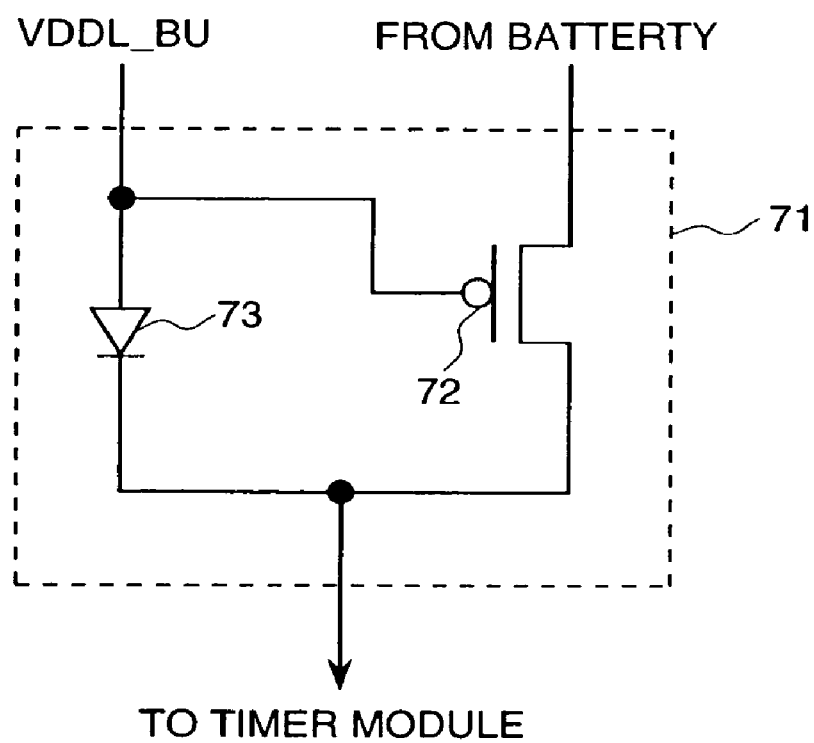
FIG. 12 is a circuit diagram of the power supply switch means.

An embodiment of power supply switch means 71 is shown concretely in FIG. 12. When the battery is connected, PMOS transistor 72 is turned off, and only VDDL_BU is supplied to the timer module if the battery potential difference to VDDL_BU is below the threshold voltage of PMOS transistor 72. When the battery is not connected, PMOS transistor 72 turns on, and the electric current is supplied to the timer module by the electric cell because VDDL_BU becomes 0 V. Diode 73 is provided so that the electric current from the electric cell should not flow into the VDDL_BU line at this time.

The timer module can keep being operated with a built-in electric cell according to this embodiment even when the power supply is not supplied from the outside, for example, by exchanging the battery. As a result, accurately measuring the elapsed time after the automobile begins running and the control cycle when controlling by periodic wake-up becomes possible. In addition, because the electrical discharge of the electric cell can be controlled when the battery is connected, that is, it is in a normal operation by having installed the power supply switch means, it is possible to extend the life time of the battery to the same degree of the period as the life cycle of the automobile. The consumption of the battery can be decreased by making the output of the timer module to be a state of high impedance to prevent the electric current from flowing into the circuit which the power supply is not supplied, or installing the diode in the power supply switch means to prevent the electric current from flowing into the VDDL_BU line even when the electric cell is used.

Although the example in which the timer module is built into power supply IC has been explained in this embodiment, a similar effect can be achieved by applying this embodiment even if the timer module is built into the microcomputer.

Further, the electrical control unit for an automobile which achieves the function that the predetermined processing can be executed by the low standby electric current can be provided by starting according to various wake-up signals even when the ignition switch is cut off according to each embodiment. Further, the electrical control unit for a suitable automobile for executing the predetermined processing by starting according to the wake-up signal for not only the low standby electric current but also the function side can be provided.

According to the embodiment, in an electrical control unit for an automobile, which is started by wake-up signals other than the ignition switch when the ignition switch is cut off, only the backup electric current is supplied to the microcomputer at the sleep, and the regulator which supplies the power supply to the CPU core is activated according to the wake-up signal to start the microcomputer. Accordingly, the standby electric current need not keep being supplied to CPU core of the microcomputer at the sleep like the conventional wake-up method to input the wake-up signal to the interrupt terminal of microcomputer. In addition, because the regulator which supplies the electric current to the CPU core need not be operated to supply this standby electric current, the standby electric current can be greatly decreased.

The electrical control unit for an automobile which uses such a wake-up method has a small standby current, and can decrease the harmful exhaust gas at the engine starting by activating the sensor etc. before the ignition switching-on by starting the electrical control unit for an automobile according to the wake-up signal transmitted from the electrical control unit for keyless entry.

Further, a periodic battery control at the ignition switching-off can be done in a hybrid automobile etc. by starting the electrical control unit for an automobile by the wake-up signal transmitted from the timer module. The electrical control unit is prevented from keeping starting by executing the shutdown processing after the execution of after the state that the ignition switch does not turn on after the execution of the system activation processing ends continues during the predetermined time of period or after the battery system control processing ends, and shifting to the sleep mode again. As a result, the amount of the electrical discharge of the battery at the ignition switching-off can be decreased.

Further, various controls become possible in this embodiment because a CPU of microcomputer 30 reads the counter value of timer module 17, and measures time. For instance, the time after the ignition switch is turned off last time is calculated at the ignition switching-on. The gross weight of the fuel leaked from the injector is estimated in this time. An unburnt element in the exhaust gas at the engine starting can be decreased by correcting fuel injection amount at the engine starting by using this estimate. Further, if timer module 17 is always operated, it is possible to know the elapsed time after the automobile begins running. Therefore, the amount of harmful exhaust gas of the automobile can be suppressed to the level equivalent to the amount immediately after beginning of running for years by estimating the deteriorating with the passage of time degree of various equipment based on the elapsed time and tuning online control parameters.

Because the function to control the power supply of the electrical control unit is integrated into one IC according to this embodiment, it becomes possible to decrease the number of parts of the electrical control unit and improve the reliability. Especially, as described so far, it is actually important to have built OR circuit 14 and wake-up factor determining register 19 into power supply IC so that the microcomputer can be started by any one of two or more wake-up signals.

The current consumption of the timer module has the tendency which increases by the influence such as the leakage on the surrounding module. However, because the timer module is built into the power supply IC of which the scale of logic is far small compared with the microcomputer, the current consumption can be greatly decreased compared with the case where this is built into the microcomputer. This is effective to decrease further the standby electric current in the electrical control unit at the sleep. According to this embodiment, it becomes possible to control the battery etc. by waking up periodically as explained in the fifth embodiment even when the microcomputer without the built-in timer module is used.

The timer module can keep being operated with a built-in electric cell according to this embodiment even when the power supply is not supplied from the outside, for example, by exchanging the battery. As a result, accurately measuring the elapsed time after the automobile begins running and the control cycle when controlling by periodic wake-up becomes possible. In addition, because the electrical discharge of the electric cell can be controlled when the battery is connected, that is, it is in a normal operation by having installed the power supply switch means, it is possible to extend the life time of the battery to the same degree of the period as the life cycle of the automobile. The consumption of the battery can be decreased by making the output of the timer module to be a state of high impedance to prevent the electric current from flowing into the circuit which the power supply is not supplied, or installing the diode in the power supply switch means to prevent the electric current from flowing into the VDDL_BU line even when the electric cell is used.

According to the present invention, an electrical control unit for an automobile of which standby current is smaller can be provided.

What is claimed is:

1. A power supply circuit comprising:
    a first regulator which generates a voltage to operate an outside microcomputer by inputting a wake-up signal from among a plurality of wake-up signals;
    an OR circuit activating the first regulator by inputting at least one of the wake-up signals;
    a wake-up factor determining register to distinguish whether the first regulator is activated by which one of the wake-up signals; and
    a second regulator which generates a voltage to be supplied to the wake-up factor determining register during the time of sleep mode.

2. The power supply circuit according to claim 1, further comprising a communication circuit for communicating with the outside microcomputer,
    wherein the content distinguished by the wake-up factor determining register is transmitted to the outside microcomputer via the communication circuit.

3. The power supply circuit according to claim 2, further comprising a timer circuit which includes a counter, a wake-up timing setting register, and a comparator, and outputs the wake-up signal when the value of the counter reaches a predetermined value set in the wake-up timing setting register.

4. The power supply circuit according to claim 3,
    wherein the outside microcomputer sets the value of the wake-up timing setting register of the timer circuit or reads the value of the counter.

5. The power supply circuit according to claim 3, further comprising:
    a first outside power supply which inputs an electric power to the second regulator;
    a second outside power supply which operates the timer circuit when the electric power is not supplied from the first outside power supply to the second regulator; and
    a power supply switch means which generates a reset signal to be outputted to the outside microcomputer,
    wherein the reset signal generating circuit outputs the reset signal to the outside microcomputer when the first regulator is activated.

6. The power supply circuit according to claim 1, further comprising a watch dog timer to prevent a runaway of an active program in the outside microcomputer.

7. The power supply circuit according to claim 1, further comprising a communication driver which sends or receives a communication signal via a communication line and a latch circuit which memorizes the level change of the communication signal.

* * * * *